(12) United States Patent  (10) Patent No.: US 11,571,005 B2
Cocchi et al.  (45) Date of Patent: Feb. 7, 2023

(54) MACHINE AND SYSTEM FOR MAKING LIQUID OR SEMI-LIQUID FOOD PRODUCTS

(71) Applicant: ALI GROUP S.r.l.—CARPIGIANI, Cernusco sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco sul (IT)

( * ) Notice: Subject to any disclaimer, the term of this patent is extended or adjusted under 35 U.S.C. 154(b) by 1005 days.

(21) Appl. No.: 16/280,798

(22) Filed: Feb. 20, 2019

(65) Prior Publication Data

US 2019/0287102 A1 Sep. 19, 2019

(30) Foreign Application Priority Data

Mar. 13, 2018 (IT) .......................... 102018000003502
Jan. 17, 2019 (EP) ..................................... 19152267

(51) Int. Cl.
*A23G 9/16* (2006.01)
*G06F 16/18* (2019.01)
(Continued)

(52) U.S. Cl.
CPC .................. *A23G 9/16* (2013.01); *A23G 9/04* (2013.01); *A23G 9/08* (2013.01); *A23G 9/228* (2013.01);
(Continued)

(58) Field of Classification Search
CPC ... A23G 9/16; A23G 9/04; A23G 9/08; A23G 9/228; A23G 9/281; A23G 9/12;
(Continued)

(56) References Cited

U.S. PATENT DOCUMENTS

2012/0312049 A1 12/2012 Downs et al.
2013/0014650 A1* 1/2013 Cocchi .................. A23G 9/228
99/453

(Continued)

FOREIGN PATENT DOCUMENTS

CN 105976231 A 9/2016
CN 107784748 A 3/2018
(Continued)

OTHER PUBLICATIONS

Chinese Office Action dated Oct. 11, 2021 from counterpart Chinese Patent Application No. 201910180339.7.
(Continued)

*Primary Examiner* — Emmanuel E Duke
(74) *Attorney, Agent, or Firm* — Shuttleworth & Ingersoll, PLC; Timothy J. Klima

(57) ABSTRACT

A machine for making liquid or semi-liquid food products, including: a first processing container for processing a basic liquid or semi-liquid product and defining a processing chamber; a stirrer positioned inside the first processing container; a thermal system including a heat exchanger, associated with the first processing container; at least one sensor, configured to measure an operating parameter of the machine; a processing and control unit, operatively connected to the at least one sensor and including a module for receiving and transmitting data captured by the sensor, wherein the module for receiving and transmitting data is configured to transmit data captured by the sensor to a "smart contract" program.

26 Claims, 7 Drawing Sheets

(51) Int. Cl.
    *A23G 9/22*         (2006.01)
    *G06Q 20/36*      (2012.01)
    *H04L 9/06*         (2006.01)
    *A23G 9/08*         (2006.01)
    *A23G 9/28*         (2006.01)
    *A23G 9/04*         (2006.01)
    *G06Q 10/08*      (2012.01)
    *G06Q 20/38*      (2012.01)
    *H04L 9/00*         (2022.01)

(52) U.S. Cl.
    CPC ......... *A23G 9/281* (2013.01); *G06F 16/1805* (2019.01); *G06Q 10/08* (2013.01); *G06Q 20/367* (2013.01); *H04L 9/0618* (2013.01); *G06Q 20/38215* (2013.01); *H04L 9/50* (2022.05)

(58) Field of Classification Search
    CPC .. A23G 9/22; A23G 9/20; A23G 9/224; G06F 16/1805; G06Q 10/08; H04L 9/0618; H04L 9/50; H04L 67/1097; A23C 13/00; G07F 17/0064; G05B 19/4183
    See application file for complete search history.

(56) References Cited

U.S. PATENT DOCUMENTS

| | | | |
|---|---|---|---|
| 2013/0230627 | A1 | 9/2013 | Hansen et al. |
| 2013/0269540 | A1* | 10/2013 | Lazzarini ................. A23G 9/28 99/455 |
| 2014/0295044 | A1* | 10/2014 | Cocchi ................... A23G 9/281 426/520 |
| 2016/0292680 | A1 | 10/2016 | Wilson et al. |
| 2016/0358169 | A1* | 12/2016 | Androulaki .......... G06Q 20/401 |
| 2019/0163896 | A1* | 5/2019 | Balaraman .......... H04L 63/0815 |

FOREIGN PATENT DOCUMENTS

| | | |
|---|---|---|
| KR | 100982678 B1 | 9/2010 |
| WO | 2017127564 A1 | 7/2017 |

OTHER PUBLICATIONS

Italian Search Report dated Oct. 18, 2018 for counterpart Italian Patent Application No. 102018000003502.

* cited by examiner

MACHINE AND SYSTEM FOR MAKING LIQUID OR SEMI-LIQUID FOOD PRODUCTS

This application claims priority to Italian Patent Application IT102018000003502 filed Mar. 13, 2018 and European Patent Application 19152267.1 filed Jan. 17, 2019. The entirety of both applications are incorporated by reference herein.

BACKGROUND OF THE INVENTION

This invention relates to a machine for making liquid or semi-liquid food products and a system for making liquid or semi-liquid food products.

A top requirement amongst user or buyers of such machines is that of being able to reduce the costs linked to the purchase and running of production machines.

In fact, as is known, the end user of a machine normally purchases the machine directly from the manufacturer, or rents it or enters into leasing contracts through special companies, and buys the basic mixtures from specialized companies.

When they begin trading, some small businesses do not have consumption volumes high enough to allow them to purchase or hire machines, therefore they often do not purchase machines or delay those purchases.

Therefore, there is a need to be able to have available a machine which, thanks to its features, can allow a reduction in costs involved in selling and/or hiring and/or production, consequently allowing its use even by businesses of any size and even when they have just begun trading.

SUMMARY OF THE INVENTION

The aim of this invention is therefore to meet the above-mentioned requirement, in particular that of making available a machine which, thanks to its features, can allow a reduction in costs involved in selling and/or hiring and/or use.

A further aim of this invention is therefore to make available a machine which, thanks to its features, can advantageously be used even for small consumption volumes.

BRIEF DESCRIPTION OF THE DRAWINGS

The technical features of the invention, with reference to the above aims, are clearly described in the annexed claims and its advantages are more apparent from the detailed description which follows, with reference to the accompanying drawings which illustrate an example, non-limiting embodiment of the invention and in which:

DESCRIPTION OF THE PREFERRED EMBODIMENTS

Figure 1:
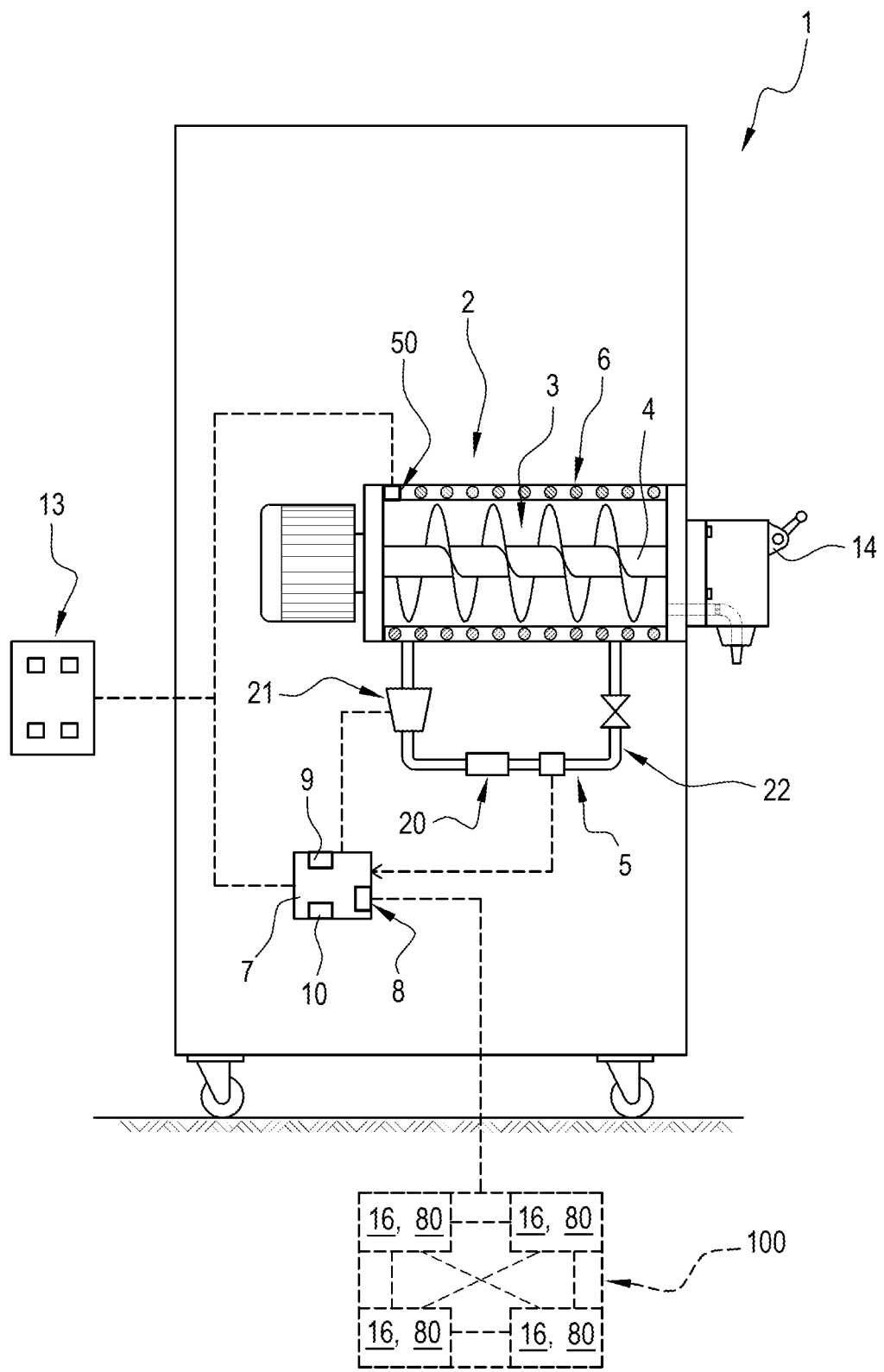
FIG. 1 is a schematic view of a first embodiment of a machine according to this invention.

According to the accompanying drawings, the numeral 1 denotes a machine for making liquid or semi-liquid food products according to the invention.

That machine 1 is preferably configured to make ice cream (artisanal or soft), or products for the ice cream trade (granitas, sorbets, etc.).

That machine 1 is preferably configured to make ice cream, pastries and similar products (for example, but without limiting the scope of the invention: ice cream, soft ice cream, granita, sorbet, shake, yogurt, frozen dessert, cold creams).

The machine 1 for making liquid or semi-liquid food products comprises:

a first processing container 2 for processing a basic liquid or semi-liquid product and defining a processing chamber 3;

at least one sensor 50, configured to measure an operating parameter of the machine 1;

a processing and control unit 7, operatively connected to the at least one sensor 50 and comprising a module 8 for receiving and transmitting data (associated with the sensor 50).

Preferably, the machine 1 comprises a stirrer 4 (preferably positioned inside the first container 2) for mixing the product contained in the first processing container 2.

Preferably, the machine 1 comprises a thermal system 5, comprising a heat exchanger 6 associated with the first processing container 2.

Preferably, the module 8 for receiving and transmitting data is configured to transmit data captured by the sensor 50 to a write module 80 for writing information to a distributed architecture database DB of the distributed ledger type.

The information write module 80 may be defined by a hardware and/or software element.

Preferably, the information is information relating to a financial transaction.

Preferably, the information is information relating to a transaction using tokens, or digital currencies.

Preferably, the distributed architecture database DB of the distributed ledger type comprises information associating the tokens, or digital currencies, with electronic addresses (electronic wallets).

Preferably, the information write module 80 comprises a "smart contract" program. Therefore, the module 8 for receiving and transmitting data is configured to transmit data captured by the sensor 50 to a "smart contract" program.

Preferably, the operating parameter of the sensor 50 is associated with a quantity of basic, liquid or semi-liquid product, fed into, present in or derived from, the first processing container 2.

According to one aspect, the sensor 50 may be a code reader (for example, a QR code or bar code reader).

Preferably, the module 8 for receiving and transmitting data is configured to transmit data captured by the sensor 50 to a "smart contract" program.

Preferably, the processing and control unit 7 can define a processing node (amongst a plurality of processing nodes) of a distributed architecture database DB of the distributed ledger type (preferably of the blockchain type).

Preferably, the smart contract program is stored in, and run by, the processing nodes.

It should be noticed that, in that production system, some (one or more) of the processing nodes may be defined by processing and control units 7 of machines 1 whilst others may be defined by computer processors (not belonging to the machines 1).

Preferably, the smart contract program is run in a "virtual machine" type environment (preferably of the "Turing-complete virtual machine" type) run by the processing nodes.

It should be noticed that, preferably, the module 8 for receiving and transmitting data is configured to receive the values captured by the sensor 50 for transmitting them to the smart contract program.

Preferably, according to another aspect, the processing and control unit 7 comprises a memory 10.

Preferably, according to another aspect, the processing unit 7 comprises a processing module 9.

According to this aspect, the processing module 9 is integrated in the processing and control unit 7, that is to say, is part of the machine 1.

The processing unit 7 is preferably a HW element (or is defined by a plurality of interconnected HW elements).

The memory 10 may be a distributed HW memory or may be concentrated in a single electronic unit.

The module 8 for receiving and transmitting data preferably comprises a data communication interface.

Preferably, the module 8 for receiving and transmitting data is configured to connect to an internet network.

Figure 4:
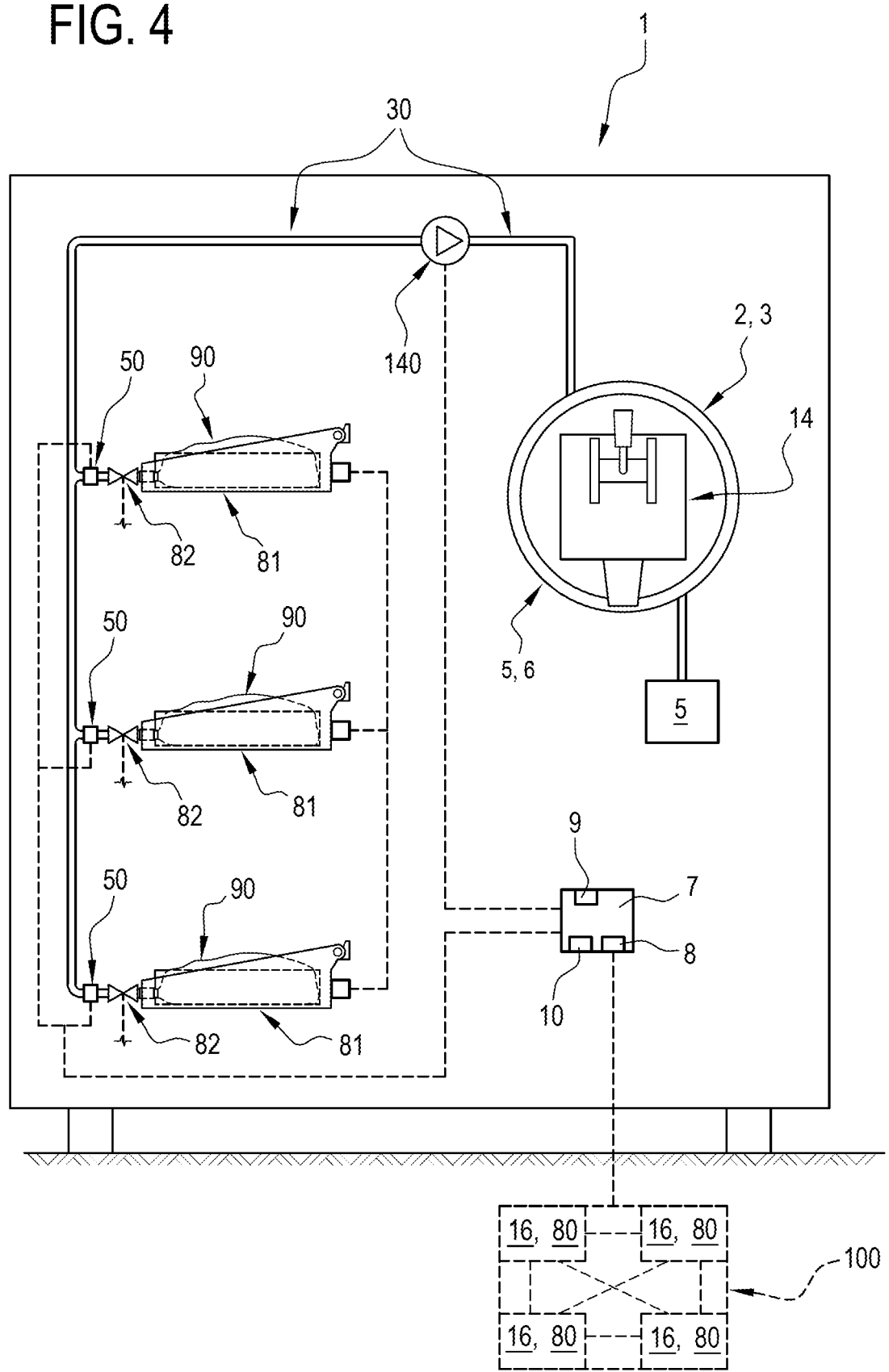
FIG. 4 is a schematic view of a fourth embodiment of a machine according to this invention.

According to one aspect, the sensor 50 is a sensor configured to capture the weight of a quantity of basic, liquid or semi-liquid product contained in the first processing container 2 or of basic product contained in a feed container (e.g.: 90 in FIG. 4).

According to another aspect, the sensor 50 is a level sensor configured to capture the level of a volume of basic, liquid or semi-liquid product contained in the first processing container 2.

According to another aspect, the sensor 50 is a sensor configured to capture a quantity of basic, liquid or semi-liquid product fed into the first processing container 2 (quantity which may be fed in from a container, from a bag, or by means of any accessory). Preferably but not necessarily, according to this aspect, the sensor 50 is a flow sensor.

According to yet another aspect, the sensor 50 is a sensor configured to capture a quantity of basic, liquid or semi-liquid product withdrawn from the first processing container 2. Preferably but not necessarily, according to this aspect, the sensor 50 is a flow sensor.

According to another aspect, the software defining a "smart contract" program is configured to read and/or store information (data) from and/or to a distributed architecture database DB of the distributed ledger type as a function of data received from the module 8 for receiving and transmitting data.

The information preferably comprises the parameters captured by means of the sensor 50.

According to another aspect, the software defining a "smart contract" program is configured to store information received from the module 8 for receiving and transmitting data to a distributed architecture database of the distributed ledger type.

According to another aspect, the software defining a "smart contract" program is configured to read and/or store information from and/or to a distributed architecture database of the blockchain type, based on data received from the module 8 for receiving and transmitting data.

Preferably, the "smart contract" program is implemented to record to the distributed architecture database (of the blockchain type) token transactions (that is to say, using a digital currency) as a function of a value captured by the sensor 50.

Therefore, the smart contract program is configured to perform token transactions between predetermined electronic addresses as a function of data received from the module 8 for receiving and transmitting data relating to at least one parameter captured by the sensor 50.

Preferably, the token transactions take place between wallet electronic addresses.

Preferably, one of the electronic addresses may belong to the machine 1 manufacturer.

Preferably, one of the electronic addresses may belong to the basic mixture manufacturer.

Preferably, one of the electronic addresses may belong to a company which owns the machine 1 (in the case of a rental or leasing contract).

It should be noticed that, advantageously, in this way it is possible to implement simply, rapidly and in a fully automated way a method of payment for machine 1 consumption, by the measurement of production volumes and the consequent generation of transactions between predetermined subjects.

In fact, using the sensor 50, it is preferably possible to measure a parameter correlated with consumption.

Use of a smart contract, which performs operations (transactions) associated with the value captured by the sensor 50, guarantees automatic and trust-based payment of the parties involved (e.g.: the machine manufacturer, the mixture manufacturer, the machine owner, etc.).

In this way, any business operator can have the machine 1 available (free of charge), automatically paying subjects based on actual consumption.

In that sense, use of a distributed architecture database guarantees the necessary transparency, reliability and security of the associated transactions.

Obviously, this is not the only advantage of that machine 1.

In fact, the sensor 50 can also read one or more parameters which are not correlated with consumption; in this case the smart contract advantageously performs information and/or token write and/or read operations to and/or from the database DB, automating some operations.

Further aspects of the machine 1 will now be described.

As illustrated in the accompanying figures, the machine 1 comprises a drive unit connected to the stirrer 4, for driving its rotation.

Preferably, the drive unit is connected to the processing and control unit 7.

According to another aspect, the thermal system 5 comprises a heat exchanger 6 associated with the first processing container 2 (previously referred to), a further heat exchanger 20, a compressor 21, and a pressure reducing unit 22.

It should be noticed that the heat exchanger 6, further heat exchanger 20, a compressor 21, and a pressure reducing unit 22 define a circuit containing a heat exchanger fluid.

In other words, the thermal system 5 is a thermodynamic system (configured to operate according to a thermodynamic cycle using a heat exchanger fluid).

The thermal system 5 is configured to cool and/or heat the product in the first container 2.

The processing and control unit 7 may be a unit of distributed type, that is to say, with distributed HW and SW elements, or it may be a single unit.

According to another aspect, the processing and control unit 7 may also define a processing (storage) node of a distributed architecture database DB of the "blockchain" type, comprising information grouped in a plurality of interconnected blocks B1, B2, . . . Bn.

Preferably, the blocks B1, B2, Bn are interconnected by cryptographic algorithms.

According to another aspect, the machine 1 comprises a user interface 13 comprising at least one user-activable command (preferably a plurality of commands) and connected to the processing and control unit 7.

Preferably, the interface 13 comprises user-activable activation and selection commands and/or push-buttons.

According to yet another aspect, the machine 1 comprises a dispenser 14, which is connected to the first processing container 2 for processing a basic, liquid or semi-liquid product, and which allows the product to be extracted from the container 2.

The dispenser 14 preferably comprises a user-activable lever for allowing the dispensing of basic, liquid or semi-liquid product.

According to another aspect, a production system 100 for making liquid or semi-liquid products is defined, comprising:

at least one machine 1 defined according to any one of the appended claims and/or as previously described;

a plurality of processing nodes defining an information write module 80 configured to write information relating to at least one parameter captured by the sensor 50 to a distributed architecture database DB of the distributed ledger type, as a function of data received from the module 8 for receiving and transmitting data.

According to another aspect, the information write module 80 is defined by a "smart contract" program configured to read and/or write information relating to at least one parameter captured by the sensor 50 from and/or to the distributed architecture database DB of the distributed ledger type.

The information read and/or written may comprise token (digital currency) transactions between predetermined electronic addresses.

In fact, according to one aspect, the processing nodes are also storage nodes of the distributed architecture database DB of the distributed ledger type.

According to one aspect, the software defining a "smart contract" program is configured to store to the distributed architecture database DB of the distributed ledger type, information received from the module 8 for receiving and transmitting data.

According to another aspect, the distributed architecture database DB of the distributed ledger type is of the blockchain type and comprises information grouped in a plurality of interconnected information blocks B1, B2, Bn.

According to another aspect, the distributed architecture database DB of the distributed ledger type comprises information associated with the presence of tokens (or digital currencies) to specific electronic addresses (electronic wallets).

According to another aspect, the processing nodes are configured to generate further tokens and to assign them to a selected electronic address as a result of adding a new block to the distributed architecture database DB of the distributed ledger type (of the blockchain type).

According to another aspect, the selected electronic address corresponds to an electronic address associated with the processing node which was the first to verify and grant an enable to add the new block to the distributed architecture database DB of the distributed ledger type.

According to another aspect, the distributed architecture database DB of the distributed ledger type is defined by (built on) the Ethereum, Ethereum Classic, or Iota, or Eos, or NEO, or Waves, or Qtum, or NEM or Multiversum or R3 Corda or R3 Corda enterprise or Ripple or Stellar or Hyperledger platform (in any of the frameworks: Fabric, Burrow, Indy, iroha, Sawtooth).

According to another aspect, the processing nodes comprise a first set of processors 16A, which are configured to keep a complete copy of the distributed architecture database DB, and a second set of processors 16B which are configured to keep a partial copy of the distributed architecture database DB.

In this way, advantageously, the processing nodes of the second set can be simpler than those of the first set and integrate a reduced capacity memory.

Preferably, each information block of the plurality of blocks B1, B2, Bn has a time-marking associated with it.

According to one aspect, the processing nodes are configured to define nodes of a distributed architecture database operating with a (consensus) protocol which is one of the following types:

proof of work;

proof of stake;

Corda consensus protocols (configured to reach consensus on the specific "state object");

CFT (Crash fault tolerant), preferably implemented with Kafka and/or Zookeeper;

Solo;

BFT (byzantine Fault Tolerance);

PBFT (practical BFT);

SBFT (simplified BFT);

Raft;

Sumeragi;

PoET (proof of Elapsed Time);

Permissioned Voting-based.

Preferably, the information blocks B1, B2, Bn are interconnected by cryptographic algorithms.

According to yet another aspect, the processing nodes are configured to generate further tokens and to assign them to a selected electronic wallet (address) as a result of adding a new block to the distributed architecture database DB (of the blockchain type).

According to another aspect, the selected electronic wallet (address) corresponds to an electronic wallet (address) associated with the processing node which was the first to verify and grant an enable to add the new block to the distributed architecture database DB.

FIG. 1 shows a machine for food products, preferably for ice cream (soft or artisanal).

Figure 2:
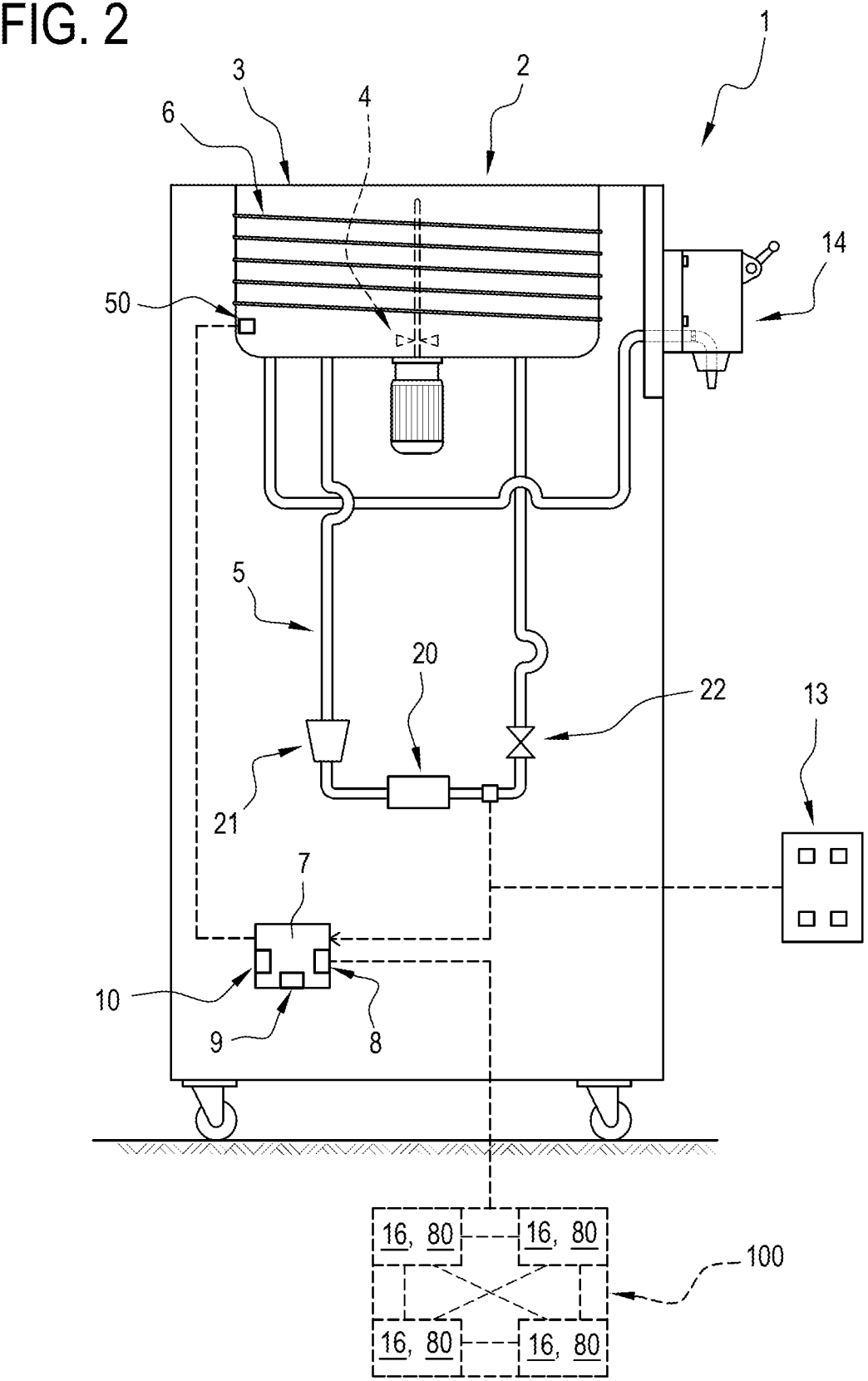
FIG. 2 is a schematic view of a second embodiment of a machine according to this invention.

FIG. 2 shows a machine configured to (thermally) treat liquid or semi-liquid products, in particular configured to allow pasteurization to be carried out.

Figure 3:
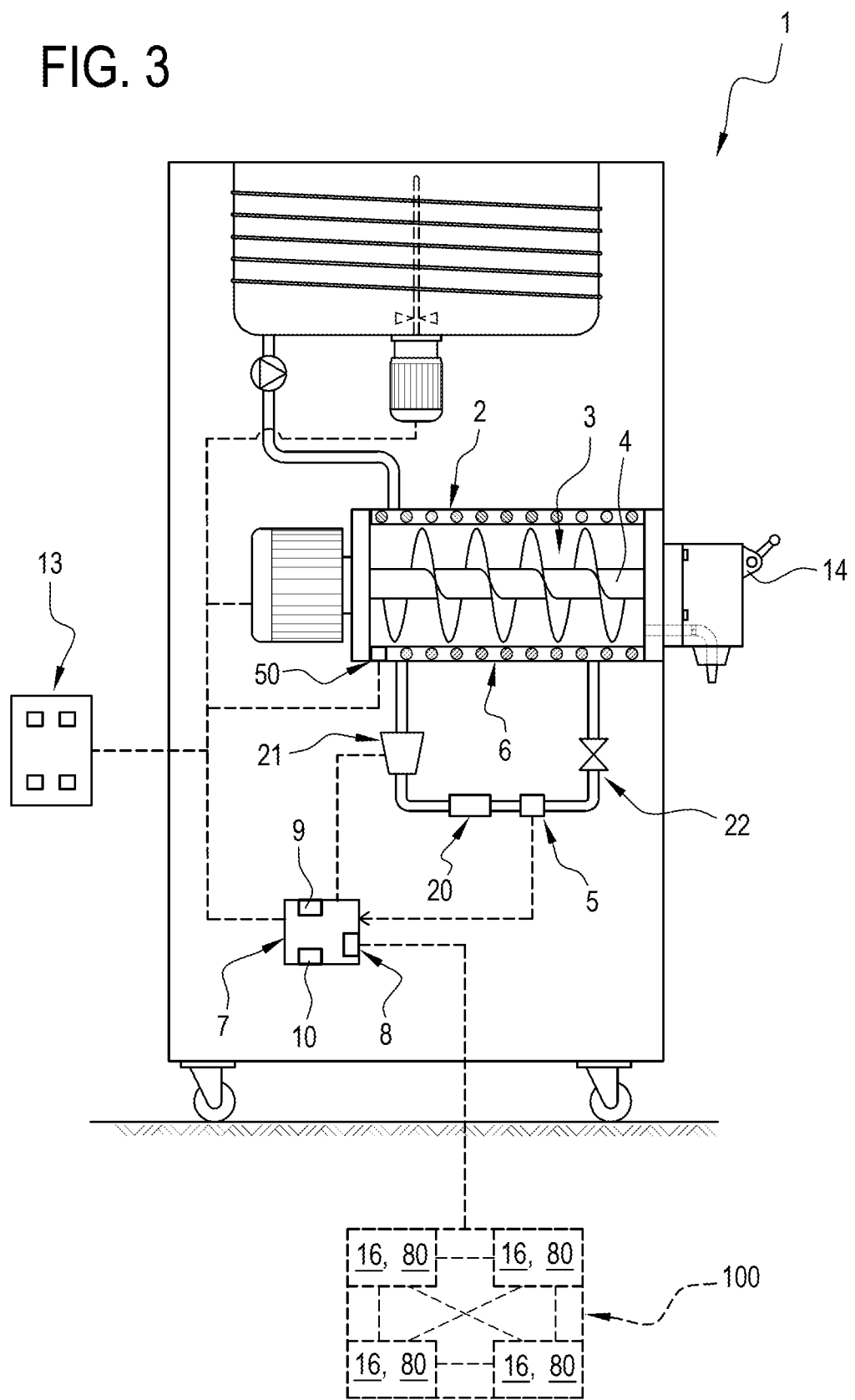
FIG. 3 is a schematic view of a third embodiment of a machine according to this invention.

FIG. 3 shows a machine which is preferably for ice cream (soft or artisanal) which is equipped with an upper thermal treatment (pasteurization) tank.

In particular with reference to FIG. 4, it should be noticed that said figure shows the presence of at least one further container 90 configured to feed the basic product to the first container 2.

The further container 90 is connected to the first container 2 by means of a pipe 30.

Preferably, the at least one further container 90 is a flexible or deformable container ("bag").

Preferably, according to one aspect, there is a pump 140 configured to allow the transfer of basic product between the further container 90 and the first container 2.

The pump 40 is preferably connected to the control unit 7.

According to further embodiments, the further container 90 is a bag-in-box type container.

Preferably, the further container 90 is supported by a supporting element 81.

Preferably, the machine 1 according to the embodiment in FIG. 4 comprises a plurality of containers 90, which can alternatively and selectively be connected to the first container 2.

Specifically, it should be noticed that associated with each container 90 there is a valve 82, configured to be switched between a closed configuration and an open configuration. In the open configuration, the valve allows basic product to be withdrawn from the container 90 with which it is associated.

Even in that embodiment, product processing is carried out in the container 2.

Preferably, in that embodiment the sensor 50 is a sensor configured to measure a flow of basic product (which is being fed into the first container 2 or withdrawn from the further container 90 or in transit along the pipe 30).

Alternatively, according to another aspect, the sensor 50 is a pressure sensor, configured to capture the weight of the basic product contained in the further container 90.

Figure 5:
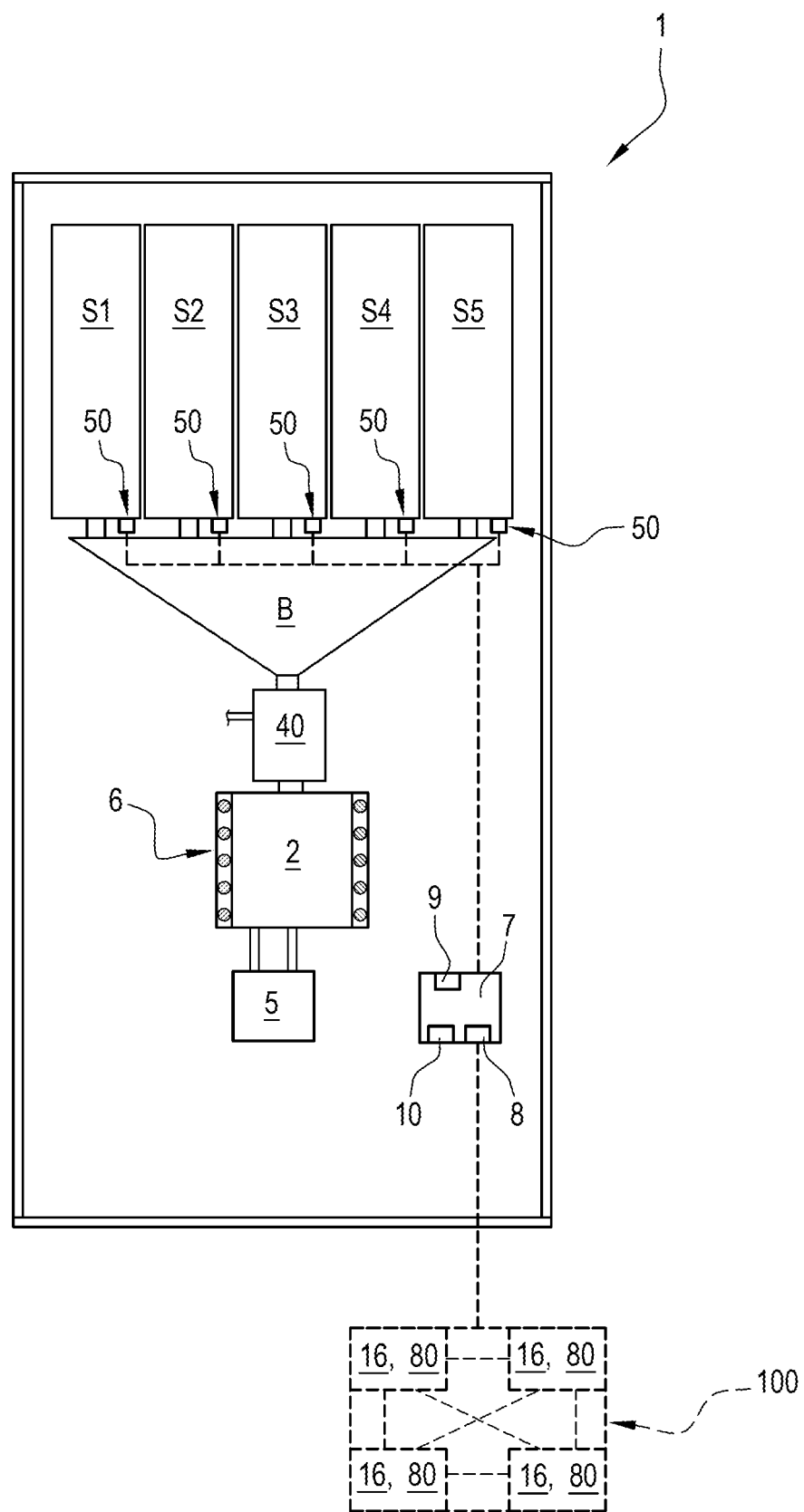
FIG. 5 is a schematic view of a fifth embodiment of a machine according to this invention.
Figure 6:
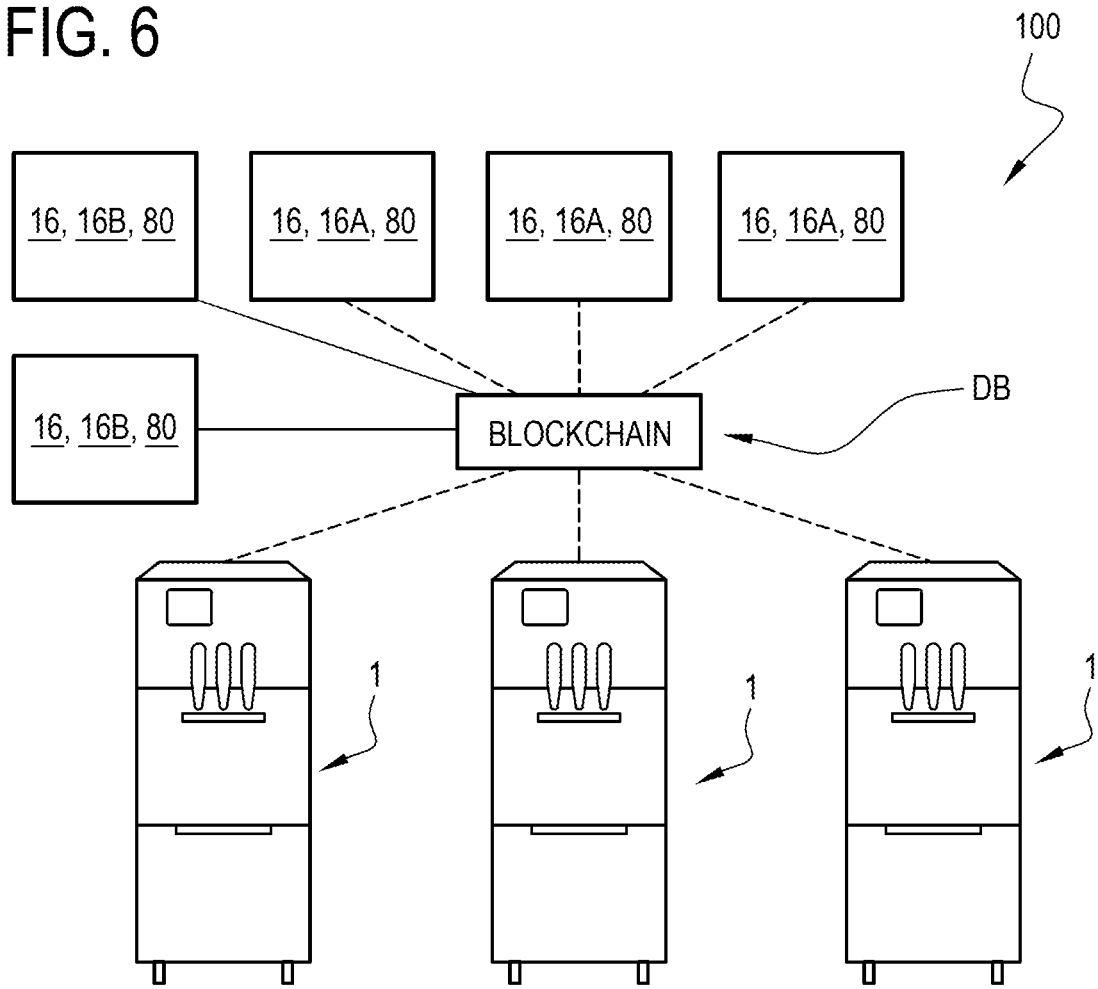
FIG. 6 is a schematic view of a system of machines according to this invention.
Figure 7:
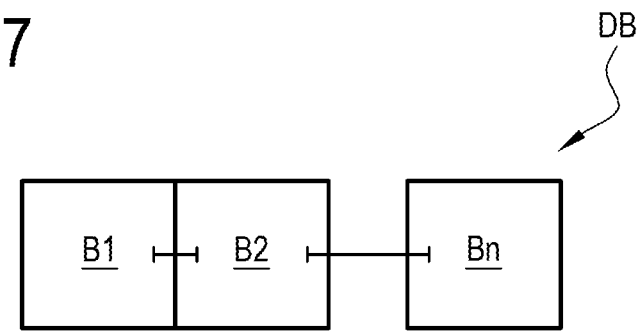
FIG. 7 is a schematic view of a distributed architecture database of the blockchain type.
Figure 8:
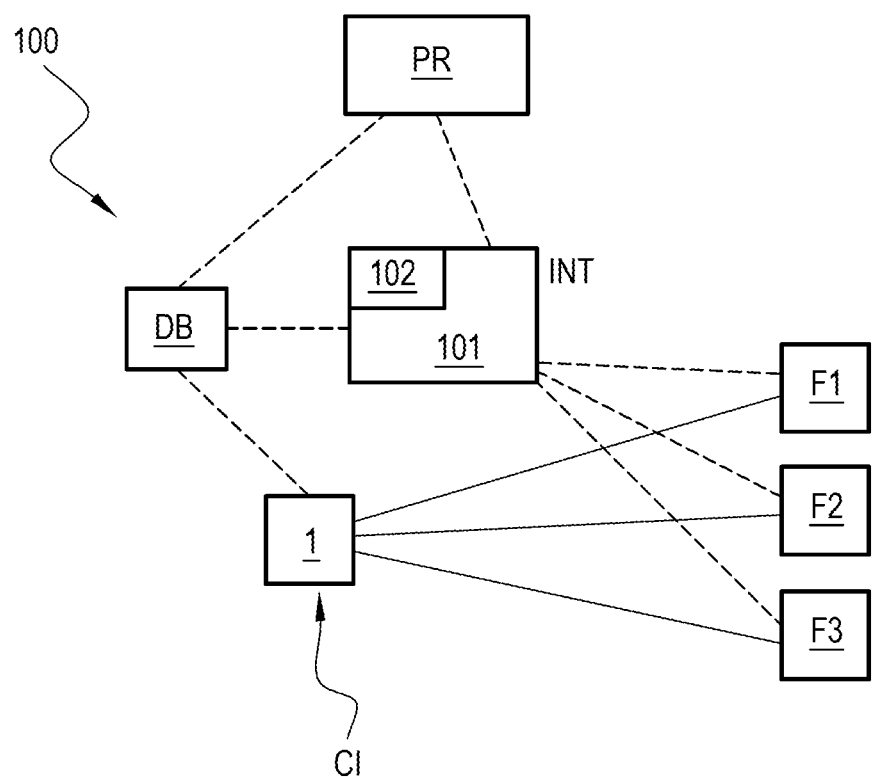
FIG. 8 is a schematic view of the information flows according to this invention.

Specifically with reference to FIG. 5, notice that said figure shows a plurality of feed containers S1, S2, S3, S4, S5 for feeding basic products to the processing container 2. Preferably, those basic products are powdered products.

It should be noticed that, preferably, the machine 1 comprises a collector B which is connected to the processing container 2.

Optionally, the machine 1 may comprise a mixing chamber 40 interposed between the first container 2 and the feed containers S1, S2, S3, S4, S5.

In the mixing chamber 40, a diluting liquid is preferably added to the powder extracted from the feed containers S1, S2, S3, S4, S5.

Advantageously, the production system 100 for making products allows the storage, in a particularly secure and reliable way, of the information received from the sensors of the machine 1/machines 1 which are part of the system.

According to another aspect, the distributed architecture database of the distributed ledger type may contain one or more of the following pieces of information:

the number of operations for refilling the processing container 2 with basic mixture;

the time (hour, day, etc.) when the refilling took place;

data relating to a code (e.g.: QR code, bar code, etc.) present on a feed container containing the basic ingredients (and scanned, for example, by a code reader which is part of the machine);

the quantity of end product dispensed by the machine 1, for example measured in terms of total number of cones produced.

Hereinafter an operation for refilling the first container 2 will be described, from which it will be possible to infer advantageous features of the system 100 according to the invention.

According to one aspect, the manufacturer/supplier of ingredients F1, F2, F3 delivers to the Client CI one or more machines 1, produced by the manufacturer PR, with consignment sale (that is to say, credit sale).

In order to make the finished product, the machine 1 operator loads the basic mixture into the first container 2.

During that operation, the operator scans the QR code present on the feed container containing the basic products to be fed into the first container 2, for example using a scanner which is present on the machine 1.

Therefore, the machine comprises a reader for reading the information which is present on the feed container (for example, a QR code or a bar code).

Then, the operator refills the first container 2 of the machine 1 with the contents of the feed container.

It should be noticed that, if the operator refills the first container 2 without first having scanned the QR code, information relating to that refilling operation having been carried out is stored in the database DB anyway.

Preferably, the system 100 comprises a (web) user interface INT.

Preferably, the (web) user interface INT is made available by means of a suitably configured remote server 101.

That user interface INT is preferably configured to query the database DB, and to present raw data and/or summary data extracted from the same database DB.

Preferably, that user interface INT may be used by one or more of the subjects involved in use of the system 100: suppliers F1, F2, F3, client CI, machine manufacturer PR, etc.

Preferably, that user interface INT may comprise a system with different access levels, one associated with each system subject: suppliers F1, F2, F3, client CI, machine manufacturer PR, etc.

Preferably, each access level corresponds to the visibility, through the user interface INT, of a predetermined data set.

Preferably, the remote server 101 also comprises a data processing unit 102.

Preferably, that data processing unit 102 processes summary data (monthly, weekly and more generally at a predetermined rate) based on the information present in the database DB.

Preferably, that summary data consists of a report containing, preferably, the information about the refilling operations (number and/or quantity of product fed in) performed on the container 2.

Advantageously, in this way automated transactions could be performed between the parties involved (suppliers F1, F2, F3, client CI, machine manufacturer PR, etc.).

The data processing unit 102 may be configured to generate, on a regular basis (daily, weekly, monthly, etc.) a report with the information about refilling operations performed.

Preferably, the processing nodes 16 are defined by processors which are external relative to the machine 1

Therefore, preferably, the processing nodes 16 are defined by remote (virtual) processors relative to the one or more machines of which the production system is composed.

According to another aspect, the database DB is resident on one or more remote servers (relative to the machine 1) and the machine 1 comprises only the module 8 for receiving and transmitting data, which is configured to transmit data captured by the sensor 50 to a write module 80 for writing information to a distributed architecture database DB of the distributed ledger type.

In use, the machine 1 is equipped with SW configured to write/read data to and/or from the distributed architecture database DB of the distributed ledger type resident on one or more remote servers which are external relative to the machine.

In contrast, the database DB is entirely resident on one or more remote servers (relative to the machine 1).

According to another aspect, the module 80 for writing information to a distributed architecture database DB of the distributed ledger type may be part of the machine 1.

What is claimed is:

1. A production system for making liquid or semi-liquid products, comprising:
    a machine for making liquid or semi-liquid food products, comprising:
        a first processing container for processing a basic liquid or semi-liquid product and defining a processing chamber;
        at least one sensor, configured to measure an operating parameter of the machine;
        a processing and control unit, operatively connected to the at least one sensor and comprising a data transfer module configured for receiving and transmitting data captured by the at least one sensor,
        a code reader;
        a write module configured for writing information to a distributed architecture database having a distributed ledger configuration;
        wherein the data transfer module is configured to transmit data captured by the at least one sensor to the write module;
        wherein the data captured by the at least one sensor includes a parameter of a quantity of the basic liquid or semi-liquid product fed into, present in or derived from, the first processing container, wherein the data transfer module is configured to transmit to the write module at least the following information for writing on the distributed architecture database:
        data relating to a code present on at least one feed container containing the basic liquid or semi-liquid product or other basic ingredients intended for supply to the first processing container and scanned by the code reader;
        the parameter of the quantity of the basic liquid or semi-liquid product;
    a plurality of processing nodes defining the write module as a function of the data received from the data transfer module.

2. The production system according to claim 1, comprising a stirrer for mixing the product in the first processing container.

3. The production system according to claim 1, comprising a thermal system, comprising a heat exchanger associated with the first processing container.

4. The production system according to claim 1, wherein the write module is defined by a "smart contract" program.

5. The production system according to claim 1, wherein the at least one sensor is a sensor configured to capture a weight of a quantity of basic, liquid or semi-liquid product contained in the first processing container.

6. The production system according to claim 1, wherein the at least one sensor is a level sensor configured to capture a level of a volume of the basic, liquid or semi-liquid product contained in the first processing container.

7. The production system according to claim 1, wherein the at least one sensor is a sensor configured to capture a quantity of the basic, liquid or semi-liquid product fed into the first processing container.

8. The production system according to claim 1, wherein the at least one sensor is a sensor configured to capture a quantity of the basic, liquid or semi-liquid product withdrawn from the first processing container.

9. The production system according to claim 1, wherein the at least one sensor is a flow sensor for measuring a flow of the basic liquid or semi-liquid product or the other basic ingredients into or out of the first processing container.

10. The production system according to claim 1, wherein the processing and control unit comprises a processing module and a memory containing processing software which defines a smart contract program configured to implement a smart contract, the smart contract program being processed by the processing module.

11. The production system according to claim 10, wherein the processing software defining the smart contract program is configured to store information received from the data transfer module to the distributed architecture database.

12. The production system according to claim 10, wherein the processing software defining the smart contract program is configured to store information to the distributed architecture database, based on the data received from the data transfer module.

13. The production system according to claim 10, wherein the processing software defining the smart contract program is configured to read and/or write information, as a function of the data received from the data transfer module, from and/or to the distributed architecture database, the distributed architecture database having a blockchain configuration.

14. The production system according to claim 10, wherein the processing module defines a processing node of the distributed architecture database.

15. The production system according to claim 1, wherein the processing nodes are defined by processors which are external relative to the machine.

16. The production system according claim 15, wherein the write module is defined by a smart contract program, run by the processing nodes and configured to read and/or write information relating to the data captured by the at least one sensor from and/or to the distributed architecture database.

17. The production system according to claim 1, wherein the distributed architecture database having the distributed ledger configuration has a blockchain configuration, and comprises information grouped in a plurality of interconnected information blocks.

18. The production system according to claim 17, wherein the information blocks are interconnected by cryptographic algorithms.

19. The production system according to claim 17, wherein the distributed architecture database comprises information about a presence of tokens to specific electronic addresses and the write module is configured to perform token transactions between predetermined electronic addresses, and wherein the write module is configured to perform the token transactions as a function of the data received from the data transfer module relating to the data captured by the at least one sensor.

20. The production system according to claim 17, wherein the distributed architecture database comprises information about a presence of tokens to specific electronic addresses and the write module is configured to perform token transactions between predetermined electronic addresses, and wherein the processing nodes are configured to generate further tokens and to assign the further tokens to a selected electronic address as a result of adding a new information block to the distributed architecture database.

21. The production system according claim 20, wherein the selected electronic address corresponds to an electronic address associated with one of the processing nodes which is first to verify and grant an enable to add the new information block to the distributed architecture database.

22. The production system according to claim 1, wherein the distributed architecture database comprises information about a presence of tokens to specific electronic addresses and the write module is configured to perform token transactions between predetermined electronic addresses.

23. The production system according to claim 1, wherein the distributed architecture database of the distributed ledger type is built on an Ethereum, Ethereum Classic, or Iota, or Eos, or NEO, or Waves, or Qtum, or NEM, or Multiversum or R3 Corda or R3 Corda enterprise or Hyperledger or Ripple or Stellar platform.

24. The production system according to claim 1, wherein the processing nodes comprise a first set of processors which are configured to keep a complete copy of the distributed architecture database, and a second set of processors which are configured to keep a partial copy of the distributed architecture database.

25. The production system according to claim 1, wherein the distributed architecture database having the distributed ledger type has a blockchain configuration and comprises information grouped in a plurality of interconnected blocks, each block of the plurality of blocks having a time-marking associated therewith.

26. The production system according to claim 1, wherein the processing nodes are configured to define nodes of the distributed architecture database operating with a consensus protocol to enable writing to the distributed architecture database which is selected from the following types:
- proof of work;
- proof of stake;
- Corda consensus protocols (configured to reach consensus on the specific "state object");
- CFT (Crash fault tolerant), preferably implemented with Kafka and/or Zookeeper;
- Solo;
- BFT (byzantine Fault Tolerance);
- PBFT (practical BFT);
- SBFT (simplified BFT);
- Raft;
- Sumeragi;
- PoET (proof of Elapsed Time);
- Permissioned Voting-based.

\* \* \* \* \*